(No Model.)

G. W. VAN SICKLE & C. McCONAUGHY.
Cultivator.

No. 238,994. Patented March 15, 1881.

Witnesses:
Chas. Nida
H. L. Wattenberg

Inventors:
George W. Van Sickle
Calvin McConaughy
by J. W. R. Lympson
Attorney.

UNITED STATES PATENT OFFICE.

GEORGE W. VAN SICKLE AND CALVIN McCONAUGHY, OF BURLINGTON, IOWA.

CULTIVATOR.

SPECIFICATION forming part of Letters Patent No. 238,994, dated March 15, 1881.

Application filed January 5, 1881. (No model.)

*To all whom it may concern:*

Be it known that we, GEORGE W. VAN SICKLE and CALVIN McCONAUGHY, of Burlington, in the county of Des Moines and State of Iowa, have invented a new and Improved Cultivator; and we do hereby delare that the following is a full, clear, and exact description of the same, reference being had to the accompanying drawings, making part of this specification.

This invention is in the nature of an improvement on the cultivator patented to us on the 21st day of July, 1874, and numbered 153,404; and the invention consists in a coupling made in two sections and pivoted together, so that by means of adjustable braces the beams of the cultivator may be raised and lowered to regulate the depth of the cultivator-irons, and also whereby the friction-rollers may be brought more or less tightly in contact with the friction-plate of the coupling against which they bear.

Figure 1:
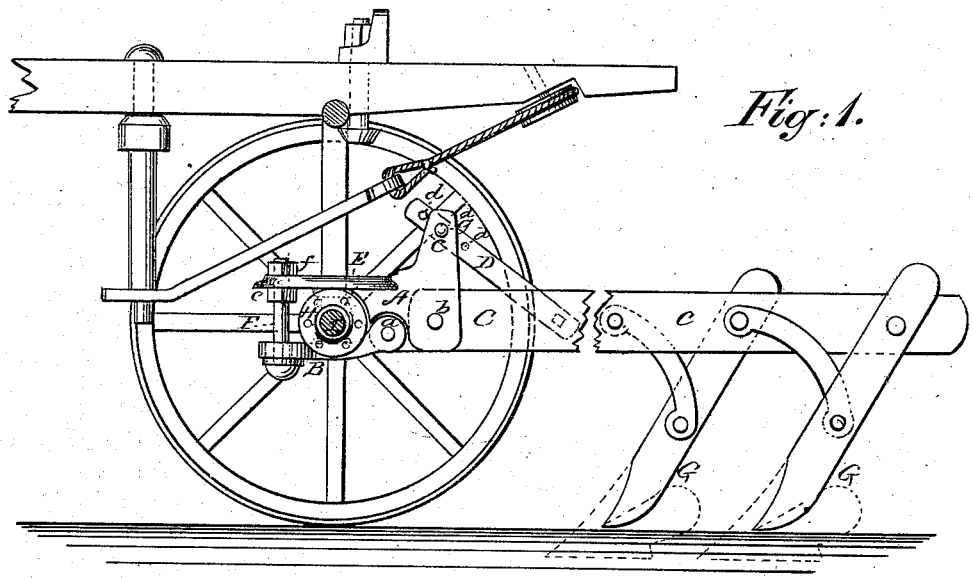
Figure 2:
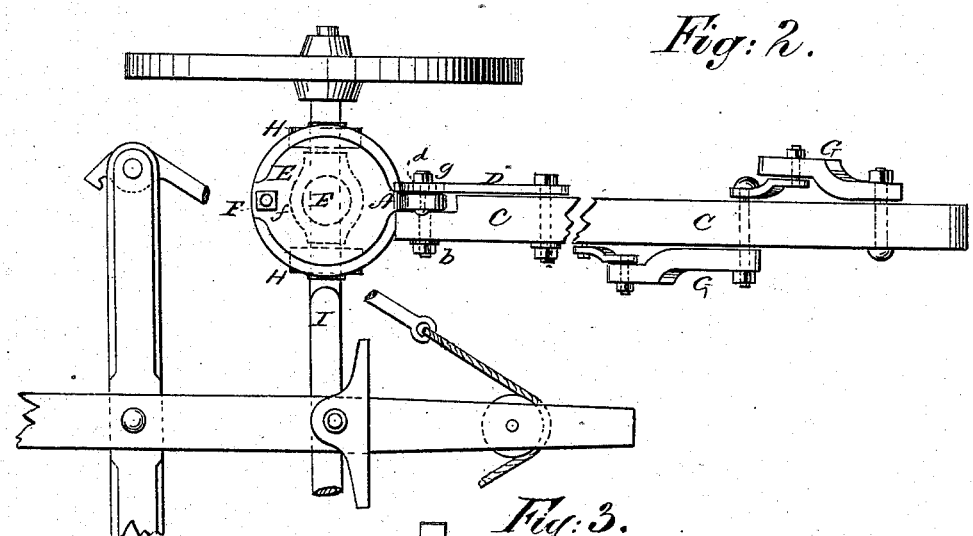

In the accompanying sheet of drawings, Figure 1 is a longitudinal section of our improved cultivator; Fig. 2, a plan or top view of same, and Fig. 3 an enlarged detail section of our coupling.

Similar letters of reference indicate like parts in the several figures.

Figure 3:
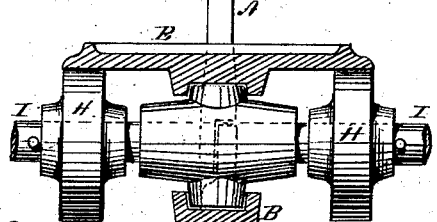

In the cultivator patented by us on the 21st day of July, 1874, No. 153,404, the beams of the cultivator were rigidly secured to the under side of the couplings which united them to the axle, and no provision was made for keeping the friction-rollers closely in contact against the friction-plate against which they bore as these rollers became worn on their peripheries, or as the necessity arose for so doing. To remedy these defects in the original cultivator patented by us, as before stated, we construct the couplings for our beams in two parts, A and B, secured together by a pivotal bolt, $a$, so that these two parts may to some extent turn on this bolt. The part or plate A of the couplings is provided with a bolt-hole, $b$, by means of which it is bolted securely to the beam C of the cultivator, and this plate A is also provided with a bolt-hole, $c$, near its upper end, as shown in Figs. 1 and 3. Through this last-mentioned bolt-hole is bolted, as at $g$, one end of brace-irons D, the other end of these braces being firmly bolted to the beams C. These braces have a series of holes, $d$, formed near one of their ends. Passing through the friction-plate E of the couplings and through the front end of the part B of the coupling is a bolt, F, provided with a head at one end and nuts $e$ and $f$ at the other.

Now, our improvements on our cultivator, patented as aforesaid, being constructed substantially as hereinbefore described, they operate as follows—that is to say: The beam C of the cultivator being bolted to the plates A of the couplings, when it becomes necessary that the cultivator-irons G shall enter deeply into the soil, as in deep tilling, the bolt $g$ is withdrawn from one of the holes $d$ in the upper end of the braces D and plates A and inserted through the uppermost hole of the series $d$ in the braces, permitting the beams C to droop and the cultivators G to enter the soil to a greater depth; and for light tilling the bolt $g$ is inserted in the lowermost hole of the series $d$, when the rear end of the beams and the cultivators will be raised more or less from their former position, and consequently not till so deeply, and in this way the depth of furrow may be regulated by inserting the bolt in any one of the series of holes $d$ in the braces D that may be desired, and as the circumstances require. This adjustment of the beam is accomplished by the pivotal bolt $a$, which unites the parts A and B together, as before described, and which, acting as a hinge to the front end of the beams, permits their rear ends to be raised and lowered.

Now, when from wear or other cause the friction-rollers H do not bear sufficiently upon the under side of the friction-plate E to accomplish satisfactory results, the bolt F, by means of the nuts $e$ and $f$ thereon, may be made to bind the friction-plate E and the plate B of the couplings closer together, so that the under surface of the friction-plate E is brought more or less tightly in contact with the peripheries of the friction-rollers H, against which they may bear with more or less force. The adjustment of this friction-plate to the rollers by means of the bolt F is accomplished by the pivotal bolt *a*, which permits the parts A and B of the couplings to turn on this pivotal bolt, the friction-plate E being secured to the part or plate A, the bolt F connecting the two parts A and B together at their front ends, causing them to act as a clamp, the friction-rollers being pivoted between them.

In the cultivator as patented by us heretofore the axle of the friction-rollers was independent of the main axle I of the cultivator. By our improvement this main axle I is made also an axle or bearing, on which the friction-rollers H revolve, thereby simplifying the construction of the cultivator, lessening its cost, and rendering the action of the friction-rollers more prompt in their operation.

Having thus described our invention, what we claim as new, and desire to secure by Letters Patent, is—

1. A cultivator with its beam C secured to the axle I by hinged couplings A B, whereby, in combination with adjustable braces D, the beams C may be raised and lowered to till more or less deeply, substantially as described.

2. In a cultivator with hinged couplings A B, friction-rollers H and friction-plates E, bolts F, and nuts affixed thereto, whereby the friction-rollers may be brought more or less tightly in contact with the friction-plates, substantially as and for the purpose described.

3. In a cultivator, couplings A B, provided with friction-rollers H and friction-plates E, secured to the main axle I, on which they revolve, substantially as and for the purpose described.

GEORGE W. VAN SICKLE.
CALVIN McCONAUGHY.

Witnesses:
M. E. BLAKE,
T. W. NEWMAN.